United States Patent [19]
Guindy

[11] Patent Number: 5,772,703
[45] Date of Patent: Jun. 30, 1998

[54] THERMAL EDGE ON DOUBLE-SIDED ELECTRODES

[75] Inventor: Wade Guindy, Henderson, Nev.

[73] Assignee: Valence Technology, Inc., Henderson, Nev.

[21] Appl. No.: 742,397

[22] Filed: Nov. 4, 1996

[51] Int. Cl.[6] .................................................... H01M 4/82
[52] U.S. Cl. .......................................... 29/623.5; 427/289
[58] Field of Search ............................... 29/623.5, 623.3; 429/241; 427/289

[56] References Cited

U.S. PATENT DOCUMENTS 3,839,090  10/1974  Morelock et al. .................. 429/241 X
4,205,432   6/1980  Mrha et al. ............................. 29/623.5
5,543,250   8/1996  Yanagihara et al. ............... 29/623.5 X
5,554,463   9/1996  Marincic et al. .................... 429/241 X

*Primary Examiner*—Stephen Kalafut
*Attorney, Agent, or Firm*—James Hsue

[57] ABSTRACT

Heat and pressure can be used to re-flow active material at the edges of an electrode section to coat burrs at the edges of the electrode section. These burrs are typically formed in the cutting of the current collector and active material to form the electrode sections. By coating the burrs with the active material, shorts are prevented when the electrode sections are laminated with the other battery sections to form a battery stack.

20 Claims, 3 Drawing Sheets

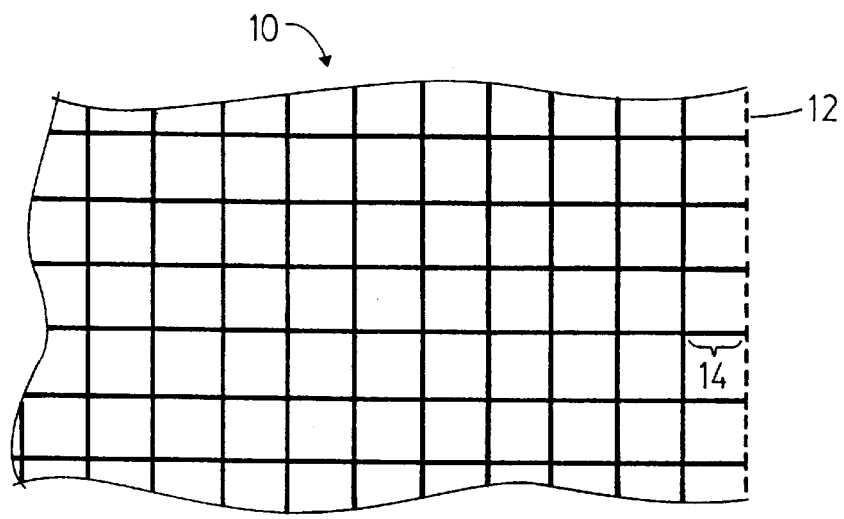
FIG._1.
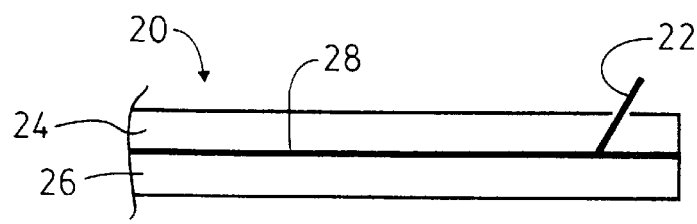
FIG._2.
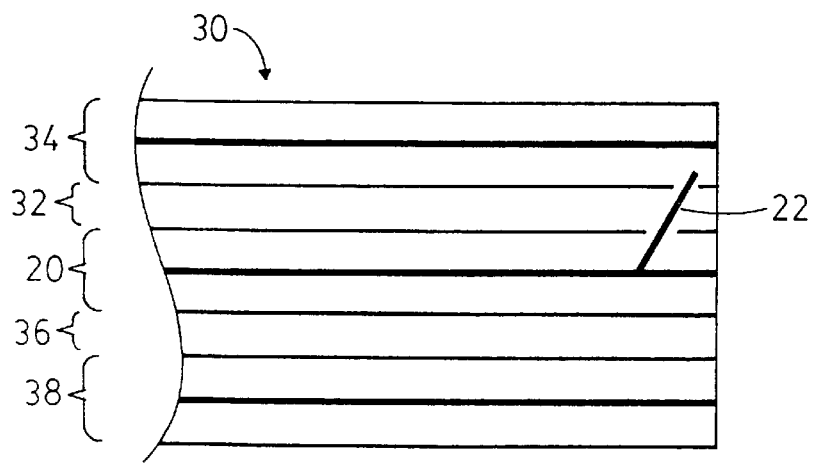
FIG._3.

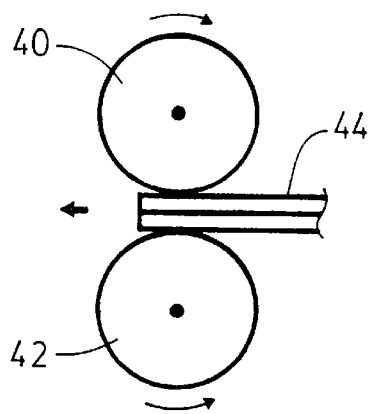
FIG._4.
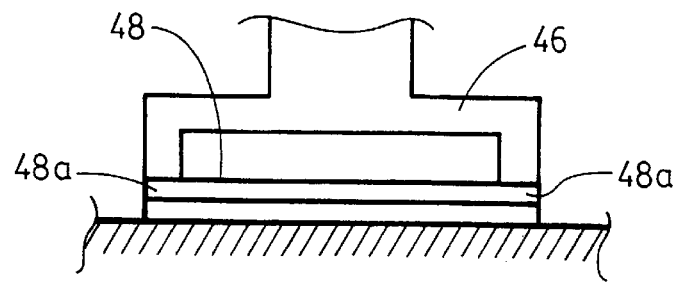
FIG._5.
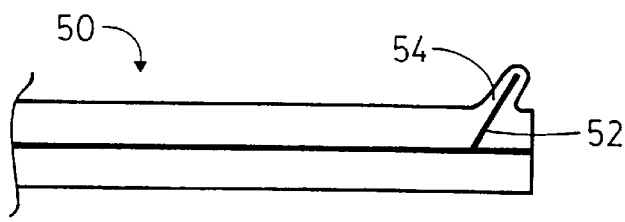
FIG._6.
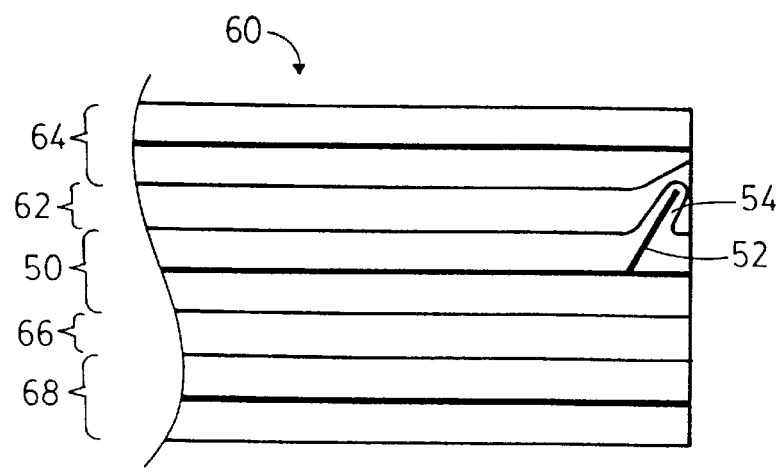
FIG._7.

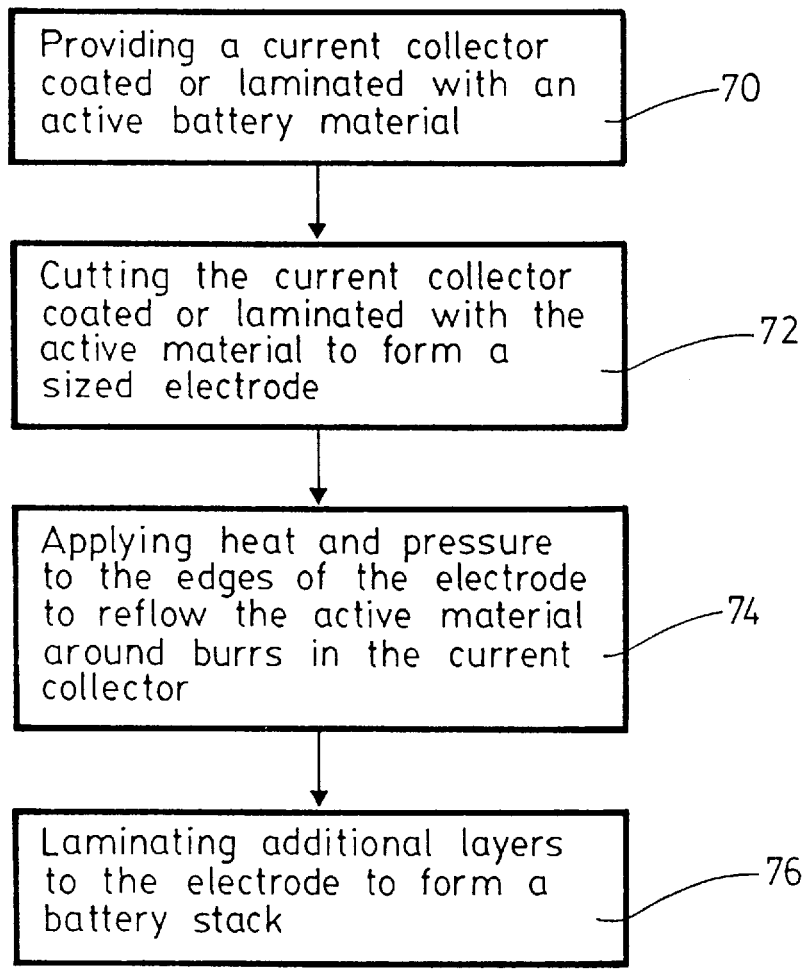
FIG._8.

THERMAL EDGE ON DOUBLE-SIDED ELECTRODES

BACKGROUND OF THE INVENTION

The present invention concerns methods of forming batteries. It especially concerns methods of forming a battery so as to avoid short-circuits.

Short-circuits are caused by the cathode section of the battery contacting the anode section. These short-circuits can result in battery failure and/or the heating of the battery.

SUMMARY OF THE INVENTION

The inventor has found that shorts in the battery may be the result of cutting of the electrode section to the desired size. In laminar batteries, an electrode section is typically comprised of a current collector coated or laminated with active material. The cutting of the electrode causes burrs in the current collector. These burrs stick out and might not be coated with the active material. In a later laminating process, these burrs can push through a separator/electrolyte layer to contact another electrode section, and thus form a short. The present invention comprises using heat and pressure to re-flow the active material at the edges of the electrode so that the active material covers the burrs and prevents shorts from forming when the battery layers are put together.

The present invention is especially beneficial with the use of wire mesh current collectors. Wire mesh current collectors are useful in forming double-sided electrodes. The wire mesh current collectors also have less volume than planar current collectors. The wire mesh current collectors are formed of wires which when cut can stick up or down causing burrs.

The present invention is especially advantageous when the wire mesh current collector is made of a relatively hard metal such as copper. Copper burrs will not easily bend under the pressures of the lamination process. Thus, copper burrs can more easily force their way through the separator/electrolyte layer, if the burrs are not re-coated with the active material.

BRIEF DESCRIPTION OF THE DRAWINGS

The above and other features and aspects of the present invention will become more apparent upon reading the following detailed description in conjunction with the accompanying drawings, in which:

FIG. 1 is a diagram of a wire mesh current collector.

FIG. 2 is a cross-sectional view of a doublesided electrode section with a burr in the current collector.

FIG. 3 is a cross-sectional view of a battery stack in which one electrode section has a current collector with a burr.

FIG. 4 is a cross-sectional view of heated rollers used to supply heat and pressure to the electrode section.

FIG. 5 is a cross-sectional view of a press for supplying heat and pressure to the edges of the electrode section.

FIG. 6 is a cross-sectional view of a double-sided electrode showing a burr coated with the active material.

FIG. 7 is a cross-sectional view of a battery stack showing a burr coated with the active material.

FIG. 8 is a flow chart of the method of the present invention.

DETAILED DESCRIPTION OF THE PREFERRED EMBODIMENT

FIG. 1 is a partial top view of a wire mesh current collector 10. The wire mesh is coated with an active material and then cut to the desired electrode size. The cut is illustrated along line 12. This cut forms a burr 14. This burr 14 can stick upwards or downwards. Cutting along line 12 can scrape active material from the burr 14. This is especially a problem with wire mesh current collectors. In a preferred embodiment, copper mesh is used for the anode section, and aluminum mesh is used for the electrode section. The copper mesh is relatively rigid and the copper burrs can be especially problematic because they can easily force their way through the separator/electrolyte layer during the lamination process. In the preferred embodiment, the active material placed on the anode section is a graphite material plus a plasticizer. In the preferred embodiment, the active material placed on the cathode section comprises lithium manganese, carbon, plasticizer and polymer.

It is impractical to cut the wire mesh before putting the active material on the mesh. The wire mesh for an electrode section would be as small as 1"by 1½. Such a small mesh section is relatively hard to handle. Because of the holes in the mesh, vacuum handlers cannot be used. It is also difficult to align the mesh section with the active material.

In a preferred embodiment, the wire mesh uses wires stretched to about two mils thick and five mils wide. Diamond-shaped openings (not shown) are provided in the mesh about 0.12 inches wide.

FIG. 2 is a cross-sectional view of a double-sided electrode section 20 showing a burr 22. The electrode section 20 includes active material layers 24 and 26 and a current collector 28. The burr 22 sticks through the active material layer 24. As discussed above, the cutting action can also cause the active material around the burr 22 to be scraped away.

FIG. 3 is a cross-sectional view of a battery stack 30 including a electrode section 20 having a burr 22. Note that the burr 22 passes through the separator/electrolyte layer 32 to the cathode section 34. The burr 22 is pressed through the separator/electrolyte layer 32 by the lamination pressure. The separator layer 32 in a preferred embodiment is relatively thin, in a preferred embodiment about 2 mils thick, before the liquid electrolyte is added. Even after the separator layer thickens when the liquid electrolyte is added, the burr 22 still forms a pinhole which can cause the battery to short. Note that the burr 22 could be facing the other direction and pass through separator/electrolyte layer 36 to the cathode section 38.

FIGS. 4 and 5 illustrate methods of supplying heat and pressure to re-coat the burrs with active material. The heat melts the active material and the pressure causes the active material to stick to the mesh. The minimum heat required to be supplied would be the melting temperature of the active material. In the preferred embodiment, metal heated to 120° C. is used to provide heat to the electrode section. The pressure required is a pressure sufficient to cause the active material to coat the burr. In a preferred embodiment, 150 pounds per square inch of pressure is used.

FIG. 4 is a cross-sectional view of heated rollers 40 and 42 for supplying heat and pressure to an electrode section 44. This embodiment necessarily supplies heat and pressure to other portions of the electrode section other than the edge.

FIG. 5 is a cross-sectional view of a heated press 46 for supplying heat and pressure to edges 48a of the electrode section 48. The press 46 can use air pressure. In this embodiment, the heat and pressure are supplied only to the edges 48a of the electrode section 48.

FIG. 6 is a cross-sectional view of a double-sided electrode 50 showing the burr 52 coated with active material 54.

The active material 54 coats the burr 52 when the edges are supplied with heat and pressure. FIG. 7 is a cross-sectional view of a battery stack 60 showing a burr 52 coated with the active material 54. The active material coating 54 prevents the burr 52 from pushing through the separator/electrolyte layer 62 so will not be a short between electrode sections 50 and 64. Separator layer 66 and electrode section 68 are also shown in this figure.

In the preferred embodiment, additional steps are done to form the battery. The plasticizer material is chemically removed from the layers, producing voids for the liquid electrolyte supplied to the battery stack. Tabs are formed at one end of the battery stack, and the battery stack is vacuum-packed in a flexible sheath material.

FIG. 8 is a flow chart illustrating the present invention. In step 70, a current collector coated or laminated with an active battery material is provided. This material is preferably provided in a sheet. In the preferred embodiment, the current collector is a wire mesh coated on both sides with the active battery material. In step 72, the current collector coated or laminated with the active material is cut to form the desired sized electrode section. In step 74, heat and pressure are applied to at least the edges of the electrode to re-flow the active material around the burrs in the current collector. In step 76, additional layers are laminated to the electrode section to form a battery stack.

Various details of the implementation and method are merely illustrative of the invention. It will be understood that various changes in such details may be within the scope of the invention, which is to be limited only by the appended claims.

What is claimed is:

1. A method of reducing shorts in a battery, the method comprising:

providing a current collector covered with an active battery material;

cutting the current collector covered with the active material to form an electrode section, burrs being formed on at least one edge of the current collector due to the cutting step; and thereafter, applying heat and pressure to at least one edge of the electrode section to coat burrs of the current collector with the active material.

2. The method of claim 1, wherein the active battery material is provided on both sides of the current collector.

3. The method of claim 1, wherein the current collector is a mesh material.

4. The method of claim 3, wherein the current collector is made of copper mesh.

5. The method of claim 1, wherein the providing and cutting steps are such that the electrode section is an anode section.

6. The method of claim 1, wherein the providing and cutting steps are such that the electrode section is an cathode section.

7. The method of claim 1, further comprising the step of laminating the electrode section with additional battery layers to form the battery.

8. The method of claim 1, wherein the heat and pressure applying step includes pressing on the at least one edge of the electrode section with a press.

9. The method of claim 1, wherein the heat and pressure applying step includes pressing on portions of the electrode section other than just the at least one edge.

10. The method of claim 1, wherein the heat and pressure applying step includes pressing on the electrode section with a heated roller.

11. A method of reducing shorts in a battery, the method comprising:

providing a wire mesh current collector covered with an active battery material;

cutting the current collector covered with the active material to form an electrode section, wire mesh burrs being formed on at least one edge of the current collector due to the cutting step;

thereafter, applying heat and pressure to at least one edge of the electrode section to coat wire mesh burrs of the current collector with the active material; and thereafter, laminating the electrode section with additional battery layers to form the battery.

12. The method of claim 11, wherein the active battery material is provided on both sides of the current collector.

13. The method of claim 11, wherein the current collector is made of copper mesh.

14. The method of claim 11, wherein the providing and cutting steps are such that the electrode section is an anode section.

15. The method of claim 11, wherein the providing and cutting steps are such that the electrode section is an cathode section.

16. The method of claim 11, wherein the heat and pressure applying step includes pressing on the at least one edge of the electrode section with a press.

17. The method of claim 11, wherein the heat and pressure applying step includes pressing on portions of the electrode section other than just the at least one edge.

18. The method of claim 11, wherein the heat and pressure applying step includes pressing on the electrode section with a heated roller.

19. A method of reducing shorts in a battery, the method comprising:

providing a current collector covered with an active battery material;

cutting the current collector covered with the active material to form an electrode section; and thereafter, applying heat and pressure to at least one edge of the electrode section.

20. The method of claim 19, wherein the cutting step is such to form burrs on at least one edge of the current collector and the heat and pressure appling step is such to to coat burrs of the current collector with the active material.

* * * * *

UNITED STATES PATENT AND TRADEMARK OFFICE
CERTIFICATE OF CORRECTION

PATENT NO. : 5,772,703
DATED : 6/30/98
INVENTOR(S) : Guindy

It is certified that error appears in the above-identified patent and that said Letters Patent is hereby corrected as shown below:

On the title page, item [54] and Col.1, Lines 1 and 2
   should read--THERMAL EDGE SEAL ON DOUBLE-SIDED ELECTRODES--.

Signed and Sealed this

Sixteenth Day of February, 1999

Attest:

Attesting Officer

*Acting Commissioner of Patents and Trademarks*